United States Patent
Bretagnol et al.

(10) Patent No.: US 11,999,362 B2
(45) Date of Patent: Jun. 4, 2024

(54) ASSEMBLY FOR PROTECTING A SENSOR/TRANSMITTER OF A DRIVER ASSISTANCE SYSTEM FOR A MOTOR VEHICLE COMPRISING A HEATING ELEMENT

(71) Applicant: VALEO SYSTEMES D'ESSUYAGE, La Verriere (FR)

(72) Inventors: Frederic Bretagnol, La Verriere (FR); Marcel Trebouet, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 291 days.

(21) Appl. No.: 17/275,443

(22) PCT Filed: Sep. 24, 2019

(86) PCT No.: PCT/EP2019/075748
§ 371 (c)(1),
(2) Date: Mar. 11, 2021

(87) PCT Pub. No.: WO2020/064760
PCT Pub. Date: Apr. 2, 2020

(65) Prior Publication Data
US 2022/0048523 A1    Feb. 17, 2022

(30) Foreign Application Priority Data

Sep. 27, 2018  (FR) ...................................... 1858840

(51) Int. Cl.
*B60W 50/00*   (2006.01)
(52) U.S. Cl.
CPC ..... *B60W 50/0098* (2013.01); *B60W 2422/00* (2013.01); *B60W 2555/20* (2020.02)
(58) Field of Classification Search
None
See application file for complete search history.

(56) References Cited

U.S. PATENT DOCUMENTS 7,645,961 B2   1/2010 Hernando Fernandez
8,899,761 B2   12/2014 Tonar et al.
(Continued)

FOREIGN PATENT DOCUMENTS

DE   102010041475 A1   6/2011
DE   102011003069 A1   7/2011
(Continued)

OTHER PUBLICATIONS

European Patent Office, International Search Report and Written Opinion of International Application No. PCT/EP2019/075748, dated Dec. 18, 2019.
(Continued)

*Primary Examiner* — James M McPherson
(74) *Attorney, Agent, or Firm* — Valeo Systemes d'Essuyage

(57) ABSTRACT

The invention relates to a motor vehicle assembly for protecting a sensor/transmitter of a driving assistance system comprising a protection device that partially surrounds the sensor/transmitter where the protection device includes a first subassembly (B) with a detection/transmission element positioned facing a sensor/transmitter's surface via which a signal passes, and a second subassembly (C) that includes a motor configured to rotatably drive the first subassembly (B) about a line of transmission/reception of the sensor/transmitter. According to the invention, the protection assembly includes at least one heating element controlled by a control unit that heats an accessory attached to the motor vehicle's body in the detection/transmission element's vicinity, the heating element being outside the protection device and in the vicinity of the first subassembly (B).

10 Claims, 3 Drawing Sheets

(56) References Cited

U.S. PATENT DOCUMENTS

| | | | |
|---|---|---|---|
| 9,296,263 B2 | 3/2016 | Muthukumar | |
| 10,514,303 B2 | 12/2019 | Krishnan et al. | |
| 10,563,571 B2 | 2/2020 | Kindl et al. | |
| 10,682,987 B2 | 6/2020 | Trebouet et al. | |
| 2003/0214733 A1* | 11/2003 | Fujikawa | B60R 1/00 359/838 |
| 2011/0073142 A1* | 3/2011 | Hattori | B60S 1/52 134/198 |
| 2011/0181725 A1* | 7/2011 | Matsuura | G03B 17/02 348/148 |
| 2012/0000024 A1 | 1/2012 | Layton | |
| 2012/0117745 A1* | 5/2012 | Hattori | B60S 1/54 134/198 |
| 2012/0243093 A1* | 9/2012 | Tonar | H10N 30/20 359/507 |
| 2015/0005982 A1* | 1/2015 | Muthukumar | B60T 8/1725 701/1 |
| 2017/0244873 A1 | 8/2017 | Izabel et al. | |
| 2018/0202349 A1* | 7/2018 | Kindl | F02B 39/10 |
| 2019/0329737 A1 | 10/2019 | Bretagnol et al. | |

FOREIGN PATENT DOCUMENTS

| | | |
|---|---|---|
| FR | 2841488 A1 | 1/2004 |
| GB | 2501500 A | 10/2013 |
| JP | S5429454 A | 3/1979 |
| JP | H06258713 A | 9/1994 |
| KR | 20180046416 A | 5/2018 |
| WO | 2012129521 A1 | 9/2012 |
| WO | 2017167577 A1 | 10/2017 |
| WO | 2018019662 A1 | 2/2018 |
| WO | 2018091641 A1 | 5/2018 |
| WO | 2018146058 A1 | 8/2018 |

OTHER PUBLICATIONS

China Patent Office, Office Action (with English translation) of corresponding Chinese Application No. 201980071172.9, dated Sep. 29, 2023.

\* cited by examiner

ASSEMBLY FOR PROTECTING A SENSOR/TRANSMITTER OF A DRIVER ASSISTANCE SYSTEM FOR A MOTOR VEHICLE COMPRISING A HEATING ELEMENT

CROSS-REFERENCE TO RELATED APPLICATIONS

This is a 371 application (submitted under 35 U.S.C. § 371) of International Application No. PCT/EP2019/075748 (WO2020064760) filed on Sep. 24, 2019, which claims the priority date benefit of French Application No. FR1858840 filed on Sep. 27, 2018, the disclosures of which are incorporated herein by reference in their entirety.

TECHNICAL FIELD

The present invention relates to the field of assisting drivers and in particular to driver assistance systems that are installed in certain vehicles. The driver assistance system being able to include a sensor/emitter for a camera comprising an objective, for example. More particularly, the invention relates to a protective casing for a sensor/emitter.

BACKGROUND

Currently, a large number of motor vehicles are equipped with sensor/emitters—for example, front-, rear- or even side-view cameras. They form in particular part of driver assistance systems, such as parking assistance systems or systems for detecting lane departure. In order to best detect obstacles located all around the vehicle, it is known practice to install sensors/emitters of driving assistance systems on the periphery of vehicles at different locations depending on the desired use. For example, at locations incorporated in the rear or front of bumpers, in side bump strips, or in regions of the rear or front license plate of the vehicle.

SUMMARY

In this case, the sensors/emitters are exposed greatly to being spattered with organic or inorganic dirt, which can be deposited on the surface through which the signal of the sensor/emitter passes and can thus reduce the effectiveness of the emission of signals in respect of image capturing or the detection of information, or even make the sensor/emitter, detector, or camera in question entirely inoperative. In particular, during periods of wet weather, rain and dirt is observed to splatter, and this may have a significant negative effect on the operability of the driver assistance system comprising such a sensor/emitter.

It will therefore be appreciated that surfaces through which the signals of the sensors/emitters pass need to be cleaned in order to ensure that they are in a proper operating state, and that this need is all the more important in a self-driving vehicle, in which the vehicle is steered on the basis of the information emitted and/or collected by the sensors/emitters.

The sensors/emitters may take the form for example of an image-capturing optical sensor such as a camera. It may be a CCD (charge-coupled device) sensor or a CMOS sensor including a matrix array of miniature photo-diodes.

The sensors/emitters may take the form of an infrared-radiation sensor such as an infrared camera, for example.

The sensors/emitters may take the form of a light emitter such as a headlamp, an optoelectronic device such as an LED (light-emitting diode), for example.

The sensors/emitters may also take the form of an electromagnetic-radiation transceiver such as a radar (radio detection and ranging) for the emission and reception of radio waves, or such as a LIDAR (light detection and ranging), or such as an infrared sensor/emitter for the emission and reception of infrared waves, for example.

The sensors/emitters may also take the form of an acoustic-radiation transceiver for the emission and reception of ultrasonic waves, for example.

It is thus known to arrange a device for cleaning the surface of the sensor/emitter through which the signal passes in the vicinity of this surface in order to remove contaminating elements that have been deposited thereon beforehand. In particular, the cleaning devices may consist of spray nozzles that are supplied with cleaning fluid. If necessary, these spray nozzles may be arranged at the end of a telescopic device configured to pass from a retracted rest position to an extended cleaning position. While the use of these spray nozzles allows appropriate cleaning of the sensors/emitters, it brings about significant operating costs since it is necessary to provide relatively large amounts of cleaning fluid and sophisticated kinematic means for the spray nozzle.

Alternatively, it is known to provide cleaning devices that have, for the one part, a protective window, arranged facing the surface of the sensor/emitter through which the signal passes such that the dirt is deposited on this window and not directly on the surface of the sensor/emitter, and, for the other part, vibrating means that are made to vibrate the protective window in order to detach the dirt therefrom. However, it has been found that the effectiveness of such a device for stubborn and encrusted dirt may be limited in spite of the vibration of the protective window.

According to another solution that is illustrated in FIGS. 1 and 2, a sensor/emitter, and by way of illustration a camera 13, of a driver assistance system is associated with a protective device 3 that comprises a protective casing 6 accommodating the sensor/emitter 13, protecting it from the exterior environment. The protective casing 6 has a transparent detection/emission element 9 arranged facing the surface 14 through which the signal passes to allow the acquisition of data. The protective casing 6 and the associated detection/emission element 9 are driven in rotation via a motor 5 that forms part of the protective device 3. More particularly, the motor 5 is configured to drive the protective casing 6 in rotation at a high enough speed to remove dirt or water that may be present on the detection/emission element 9 by a centrifugal effect. This centrifugal-effect cleaning solution is much more effective than the setting of the detection/emission element 9 described above in vibration.

The sensor/emitter 13 is disposed in the vicinity of a grille 7 of a motor vehicle 100, as illustrated in FIG. 3. In order to allow the acquisition of data, an opening 2 is made in the grille and the detection/emission element 9, arranged at the front of the protective casing 6, is disposed at least partially in the opening, it being understood that the detection/emission element 9 is disposed as far forward as possible in order to improve the detection/emission angles such as the image-capturing angles in the case of a camera. Since the detection/emission element is able to rotate, an operating clearance is formed radially between the detection/emission element 9 and the edge delimiting the opening 2.

In the event of severe cold, a layer of ice may form between the protective casing 6 and the edge delimiting the opening 2 in the grille, and so the protective casing 6 may be stuck in position. If the layer of ice has a minimal thickness, it is possible to break this layer of ice by rotating the motor 5 at a speed greater than that intended for the cleaning operation. However, above a certain thickness and density of the layer of ice, using the motor to break the layer of ice may cause the motor to overheat and to malfunction, without the motor otherwise being certain to cause the protective casing to pivot.

The present invention proposes solving this technical problem by presenting an alternative to a protective casing for a sensor/emitter as described above, which is able to be used in wintry conditions.

To this end, the subject of the invention is an assembly for protecting a sensor/emitter of a driver assistance system for a motor vehicle, having a protective device at least partially surrounding a sensor/emitter, the protective device comprising a first subassembly having a detection/emission element arranged facing a surface of the sensor/emitter through which a signal passes, and a second subassembly having a motor configured to drive the first subassembly in rotation about an emission-reception axis of the sensor/emitter.

The invention is noteworthy in that the protective assembly has at least one heating element controlled by a control unit for heating at least one accessory fixed to the body of the motor vehicle in the vicinity of the detection/emission element, the heating element being present on the outside of the protective device and in the vicinity of the first subassembly.

An "accessory fixed to the body" is understood to be any element attached to the body by being fixed directly or indirectly, such as a grille, a bumper or a headlamp.

The expression "in the vicinity of the first subassembly" means the positioning of at least one heating element next to the first subassembly so as not to impede the rotation of the first subassembly by the second subassembly while being sufficiently close to the first subassembly to rapidly melt a layer of snow and/or ice present on the surface thereof or in the space left as an operating clearance between the detection/emission element of the first subassembly and the accessory fixed to the body of the motor vehicle, facing which the protective assembly is arranged. Of course, the distance between the heating element and the detection/emission element may vary depending on the power of the heating element.

Thus advantageously, the invention proposes the use of a heating element positioned on the outside of the protective device for a sensor/emitter of a driver assistance system for a motor vehicle, in order for the motor of the second subassembly to remain operational in wintry conditions to allow the removal of dirt present on the detection/emission element of the first subassembly by a centrifugal effect. According to another advantage, the heating element(s) is/are positioned on the outside of the protective device in order to limit the bulk thereof and not to modify the out-of-balance value of the first subassembly.

According to one aspect, the protective device is a separate element from the detection/emission element.

According to one alternative, the protective device is part of the detection/emission element.

According to various features of the invention, taken alone or in combination, it may be provided that:
  the control unit is configured to likewise control the operation of the sensor/emitter.
  the at least one heating element has at least one fixed part that is disposed at a distance from the protective device and is able to be positioned in the vicinity of the accessory fixed to the body, said fixed part being supplied with current by the control unit.
  the at least one heating element is a resistive element supplied with electricity via the control unit, the resistive element forming said fixed part.
  the at least one heating element is disposed on a holder secured to the protective device.
  the holder has a fixed frame secured to the protective device and a movable assembly to which the at least one heating element is fixed and which is able to slide along the emission-reception axis. In other words, at least one heating element is directly connected to the second subassembly via the holder. The holder may also serve as a holding frame for keeping the protective device on the structure of the motor vehicle. Advantageously, the holding frame may have fixing means. The fixing means are configured to keep the detection/emission element of the first subassembly in the vicinity of or on a part of the body of a motor vehicle.
  the holder has elastic means arranged between the fixed frame and the movable part, these elastic means being configured and arranged to make it possible to compress at least one heating element present on said holder against a part of the body of a motor vehicle, for example against a grille.
  the at least one heating element has an electromagnetic induction source forming said fixed part and an associated induced metal element which is disposed against an external face of the protective device.

According to another set of features of the invention, taken alone or in combination, it may be provided that:
  the heating unit is configured to activate the at least one heating element when a driver switches on or starts the motor vehicle. Of course, the control unit comprises means for detecting at least one scenario mentioned above. By way of non-limiting example, the control unit is configured to connect to an on-board computer of a motor vehicle in order in this way to identify the switching on and/or starting of said vehicle.
  the control unit is configured to activate the at least one heating element upon the motor vehicle being started, when the control unit detects abnormal resistance for driving the first subassembly in rotation. In other words, the control unit is able to measure the force necessary for driving the first subassembly in rotation about the sensor/emitter. If a predetermined force threshold value is exceeded, the control unit is configured to activate at least one heating element according to the invention. Thus, if a layer of snow and/or ice builds up at the first subassembly, at least one heating element is activated in order to melt said layer. This embodiment is particularly advantageous when snow and/or ice builds up on the protective casing when the motor vehicle is in movement. Preferably, this condition is implemented when the temperature outside the vehicle is at least less than 2° C.
  the control unit is configured to activate the at least one heating element for a given time interval, preferably for a time interval of one or more minutes, or a shorter time interval of a few seconds or tens of seconds. Of course, the length of time for which the heating element is activated depends on the heating power thereof and optionally on the outside temperature. In other words, the control unit is configured to activate at least one heating element from the switching on or starting of a motor vehicle comprising the protective device. The heating element(s) is/are activated for a predefined period of time, so as to ensure the rapid melting of a layer of snow and/or ice present on the surface of the first subassembly. The motor can thus freely set the first subassembly in rotation about the sensor/emitter in order to remove the presence of dirt on the detection/emission element by a centrifugal effect.

the control unit is configured to activate the at least one heating element when the temperature outside the vehicle is at least less than 2° C.

the at least one heating element can be activated by the control unit when the above described conditions have been aggregated, that is to say combined at the same time.

the at least one heating element surrounds the detection/emission element of the first subassembly. By way of non-limiting example, a heating element has an elliptical or polygonal shape and the first subassembly is inscribed in the shape of the heating element.

The invention also relates to a motor vehicle comprising an assembly for protecting a sensor/emitter of a driver assistance system, wherein, as defined above, the sensor/emitter is present in the motor vehicle, and the detection/emission element of the protective casing is present at an opening formed in a wall of the body, and at least one heating element is positioned on the wall. The wall may for example correspond to an element of a grille, of a bumper, of a rear-view mirror or of a license plate of a motor vehicle.

BRIEF DESCRIPTION OF THE DRAWINGS

Further features and advantages of the invention will become more clearly apparent from reading the following description, which is given by way of nonlimiting illustrative example, and from the appended drawings, in which.

DETAILED DESCRIPTION

Figure 1:
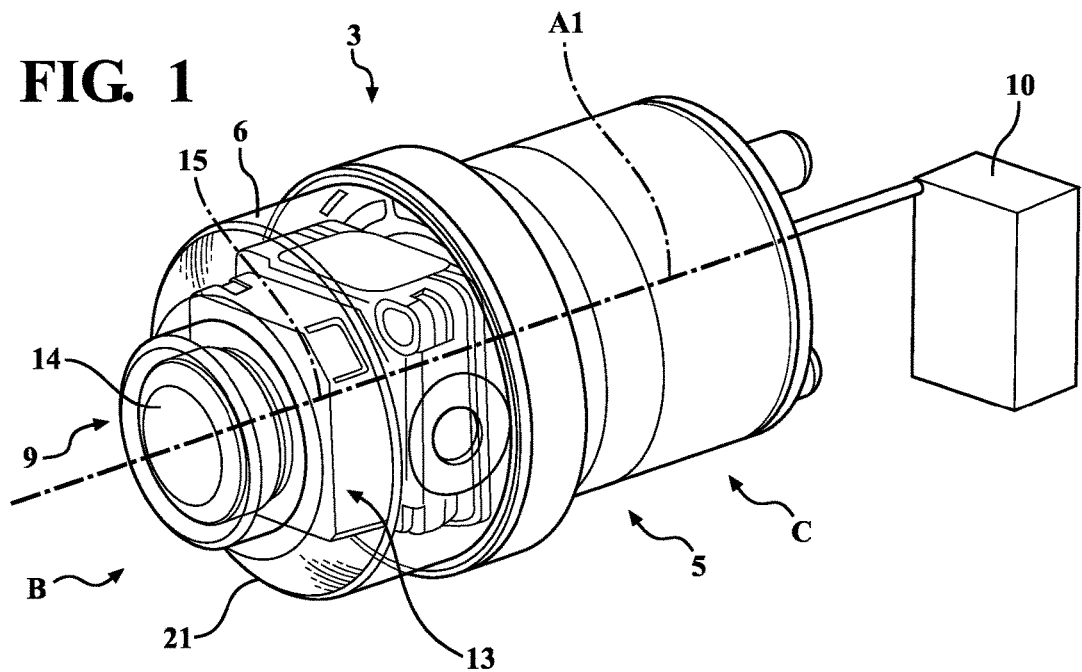
FIG. 1 shows a schematic and perspective view of a protective casing for a sensor/emitter of a driver assistance system, according to the prior art.
Figure 2:
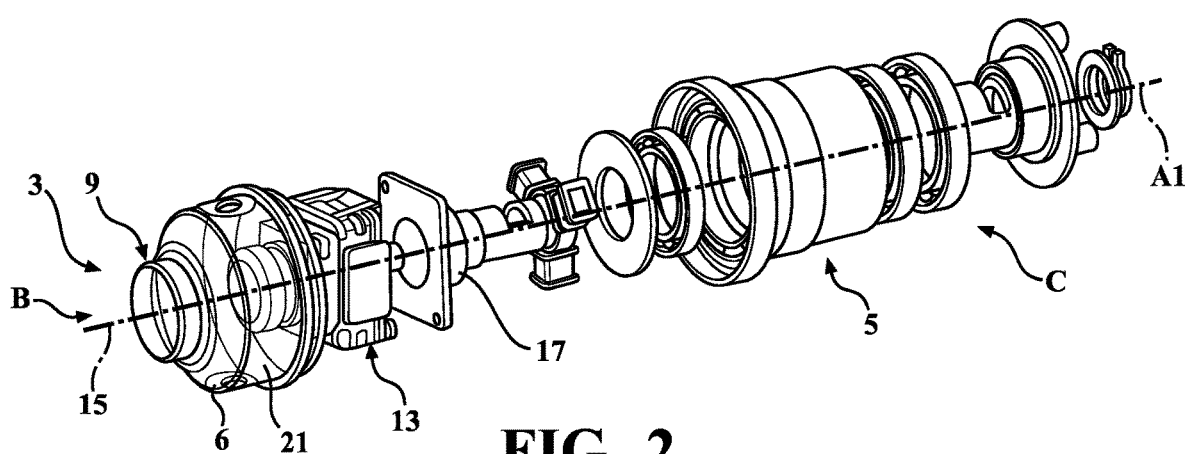
FIG. 2 shows a schematic and perspective exploded view of the protective housing illustrated in FIG. 1.
Figure 3:
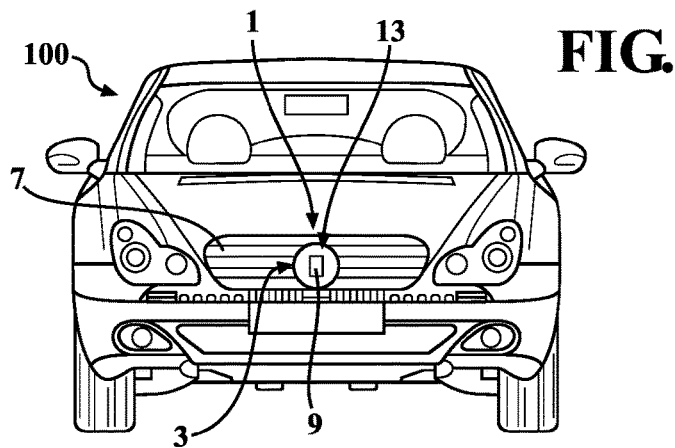
FIG. 3 shows a face-on view of a motor vehicle, comprising a driver assistance system at its grille.

It should first of all be noted that the figures set out the invention in detail for implementing the invention, it being, of course, possible for said figures to serve to better define the invention if necessary. In these figures, identical elements have the same references. The various embodiments are examples. Although the description refers to one or more embodiments, this does not necessarily mean that each reference relates to the same embodiment, or that the features apply to just one embodiment. Individual features of different embodiments can also be combined or interchanged in order to create other embodiments.

Furthermore, it should be noted that in the description, certain elements may be indexed, with for example a first element or a second element. In this case, the index is simply used to differentiate and denote elements that are similar but not identical. This indexing does not imply that one element takes priority over another and such denominations can easily be interchanged without departing from the scope of the present description.

A driver assistance system according to the invention has at least one sensor/emitter 13 and a protective device 3 arranged around this sensor/emitter, and a heating element configured to remove or weaken a layer of ice or any other deposit preventing the relative movement of the movable part of the protective device with respect to the accessory fixed to the body of the vehicle, close to which the sensor/emitter and the associated protective device are disposed.

The sensor/emitter 13 is for example an image-capturing optical sensor such as a camera. It may be a CCD (charge-coupled device) sensor or a CMOS sensor including a matrix array of miniature photodiodes. According to another variant, without this list otherwise being exhaustive, it may be an infrared-radiation sensor such as an infrared camera, a light emitter such as a headlamp, an optoelectronic device such as an LED (light-emitting diode), an electromagnetic-radiation sensor/emitter such as a LIDAR (laser imaging, detection and ranging) or RADAR (radio detection and ranging). According to another variant, it may be an ultrasonic radiation sensor/emitter.

A first embodiment of the invention will be described first, with reference to FIGS. 1 to 4.

The sensor/emitter 13 has a surface 14 through which a signal passes and an emission-reception axis 15. The surface 14 is for example an optical surface such as a camera objective, which may have one or more lenses depending on the field of view and the resolution that are desired.

The sensor/emitter 13 is mounted at least partially in a protective casing 6 forming a first subassembly B of the protective device 3. To this end, the protective casing 6 has a housing limited by a wall 21. This wall 21 is preferably centered about the emission-reception axis 15 of the sensor/emitter 13. In the example illustrated, the wall 21 has a substantially cylindrical shape.

The protective casing 6 also comprises a detection/emission element 9 that is formed by a transparent wall and is disposed downstream of the surface 14 of the sensor/emitter 13 through which the signal passes. This detection/emission element 9 is advantageously dimensioned so as to cover the entire surface 14. In other words, the detection/emission element 9 is arranged in the emission-detection field of the sensor/emitter 13, the transparent wall making it possible for the effectiveness of the sensor/emitter 13 not to be impaired. The detection/emission element 9 may be formed in one piece with the protective casing 6. As an alternative, the protective casing 6 and the detection/emission element 9 may be two separate parts that are secured together. The transparent wall forming all or part of the detection/emission element 9 may be made of glass or of a plastics material such as polycarbonate. The protective casing 6 may be made of any appropriate material known to a person skilled in the art, preferably from a fluid tight material.

What is meant by the detection/emission element 9 being disposed downstream of the surface 14 through which the signal passes is that the detection/emission element 9 is disposed between the outside of the vehicle and the surface 14 of the sensor/emitter 13, such that the detection/emission element 9 protects the surface 14 from any spattering of dirt or solid debris that could spoil this surface 14. It is therefore an element for protecting, or more precisely a mask for protecting, the sensor/emitter 13, and it is this/emission element 9 that is subject to attacks from the outside, i.e. to water spatter, pollutants, small pieces of stone, and also pollutant deposits or water stains. In order to allow the surface of the detection/emission element 9 to be cleaned by a centrifugal effect, as described above, the protective device 3 has a motor 5 forming a second subassembly C. The motor 5 is coupled to the protective casing 6 so as drive the protective casing 6, and therefore the detection/emission element 9, in rotation about an axis of rotation A1 coincident with the emission-reception axis 15 of the sensor/emitter 13. The motor is controlled by a control unit 10 shown in FIGS. 1 and 4.

The two subassemblies B and C form, when they are assembled, the protective device 3 preventing dirt from reaching the sensor/emitter 13. Note that the protective device 3 also has a support element 17, visible in FIG. 2, secured to a fixed part of the motor 5 such that the sensor/emitter 13 is immovable when the protective casing 6 is pivoted by the motor.

In a known manner, the above-described protective device 3 is mounted on a motor vehicle so as to allow a driver assistance system to acquire data relating to a road scene, by virtue of the sensor/emitter 13 present in the protective device 3. For esthetic reasons, the protective device 3 is positioned inside the motor vehicle, behind an accessory 7 fixed to the body of the vehicle. According to the nonlimiting example illustrated in FIG. 3, this accessory 7 fixed to the body consists of the grille of the motor vehicle 100.

Figure 4:
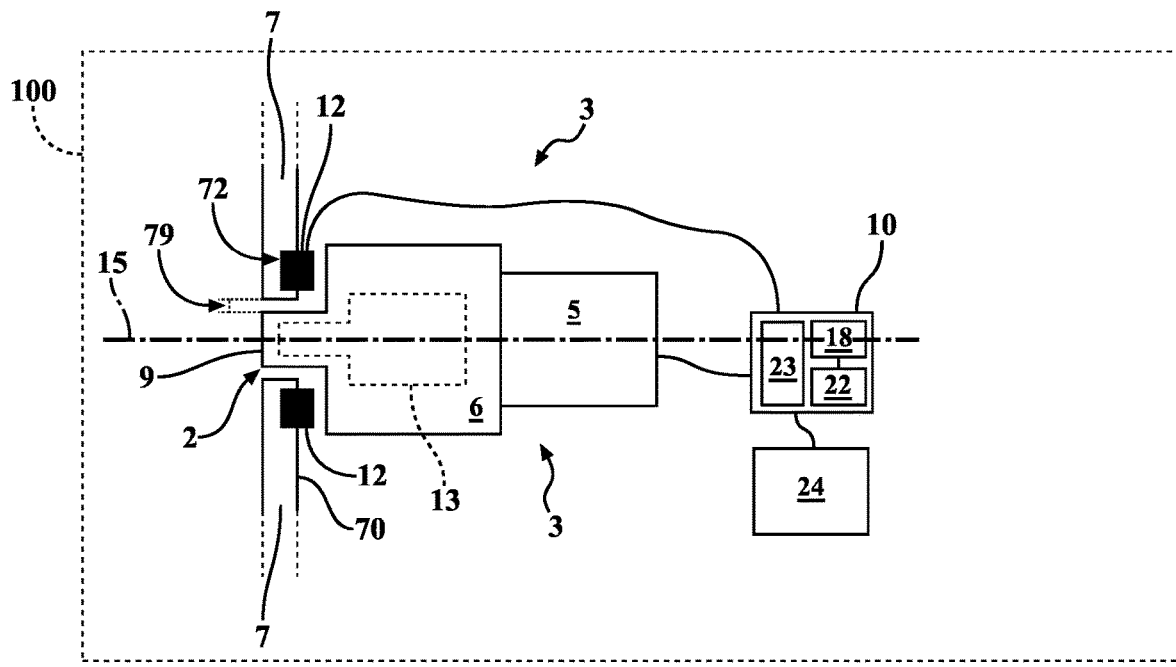
FIG. 4 schematically shows a partial longitudinal section through a motor vehicle, for example the vehicle in FIG. 3, incorporating a protective device for a sensor/emitter of a driver assistance system, according to a first embodiment of the invention in which a heating element is secured to an accessory fixed to the body and around an opening formed in this accessory fixed to the body and through which the sensor/emitter is able to emit/detect signals.

In particular, as illustrated in FIG. 4, the sensor/emitter 13, illustrated by dashed lines, and the protective device 3 disposed around this sensor/emitter are positioned facing an internal face 70 of the accessory fixed to the body, said face being internal in that it is oriented toward the interior of the body. Of course, the accessory 7 fixed to the body has an opening 2, the shape and dimensions of which allow the sensor/emitter 13 to acquire data relating to the road. As illustrated in FIG. 4, the sensor/emitter 13 is positioned as close as possible to the accessory fixed to the body, in order not only for the edges of the accessory fixed to the body not to appear in the emission-detection field of the sensor/emitter 13 but also for the exterior appearance to be good.

The detection/emission element 9 extends at least partially into the opening 2 in the protective casing 6. In the example illustrated, the detection/emission element 9 is disposed in the plane defined by the internal face 70 of the accessory 7 fixed to the body, it being understood that this detection/emission element 9 could, without departing from the context of the invention, be disposed in the thickness of the accessory fixed to the body, provided that a space 79 is provided radially to form an operating clearance allowing the rotation of the protective device without impairing the accessory fixed to the body.

It will be understood that FIG. 4 schematically illustrates the protective assembly according to the invention, with a space 79 that is exaggerated to make it visible. By way of example, the opening 2 may have a circular shape with a diameter less than or equal to 5 cm, and the space 79 measures between 0.3 mm and 0.5 cm, preferably between 0.6 and 0.4 mm.

As explained above, in wintry conditions, when the outside temperature becomes negative, a layer of snow and/or ice may build up in the spaces formed at the opening 2 between the protective casing 6, in particular the detection/emission element 9, and the accessory 7 fixed to the body, in this case the grille. The presence of this layer hampers or even prevents the pivoting of the protective casing 6 by the motor 5. It is thus no longer possible to effectively clean the detection/emission element by a centrifugal effect, as described above. The system for cleaning the detection/emission element 9 is thus ineffective or inoperative.

According to the invention, the protective device 3 is associated with at least one heating element 12 positioned outside the protective device 3, and more particularly around the opening 2, formed in the accessory fixed to the body, in abutment against the internal face 70 of this accessory fixed to the body. Advantageously, and as illustrated schematically in FIG. 4, the heating element 12 is disposed as close as possible to the edges delimiting the opening 2. As a result, the starting up of the heating element makes it possible to heat the accessory fixed to the body and to melt, by conduction and convection of heat, the layer of ice that has been able to stick to this accessory fixed to the body and to the protective casing 6. At least incipient cracking of the ice is effected at the accessory fixed to the body, this then making it easier to break the ice by rotation of the detection/emission element 9 provided at the end of the turning protective casing 6. It is particularly advantageous for the heating element to be disposed on the outside of the protective casing and directly in contact with, or at least as close as possible to, the accessory fixed to the body in order that the heat generated by the heating element is able to propagate in the region of the ice without excessive power consumption being necessary.

The protective device 3 and the heating element 12 thus form a protective assembly 1 associated with a sensor/emitter 13 and configured both to ensure cleaning by a centrifugal effect on account of the rotation of a detection/emission element situated facing the sensor/emitter 13 and also to ensure that this cleaning by a centrifugal effect can be operational under any conditions and in particular under very cold climatic conditions.

In the first embodiment of such a protective assembly, and in particular as illustrated in FIG. 4, the protective device 3 and the heating element 12 are two elements that are separate from one another, with the heating element 12 being secured to the accessory 7 fixed to the body.

According to the example illustrated in FIG. 4, the heating element 12 is positioned against the internal face 70 of the accessory fixed to the body, as close as possible to the opening 2, in a cavity 72 provided in the thickness of this internal face 70. It will be understood that the positioning of the heating element 12 on the internal face 70 of the grille allows the heating element 12 not to be visible from outside the motor vehicle 100, in order to preserve the external appearance thereof.

Figure 6:
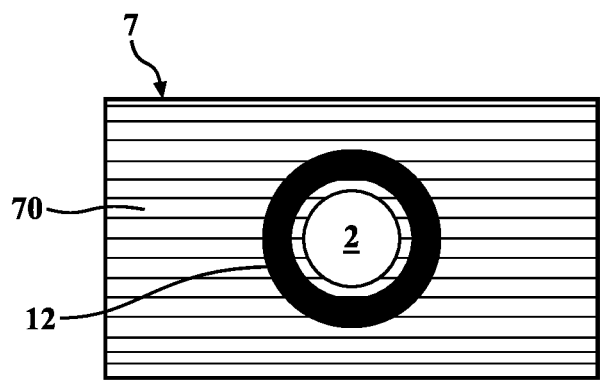
FIGS. 6 to 8 schematically show possible arrangements of the heating element around the opening made in the accessory fixed to the body of the vehicle.
Figure 7:
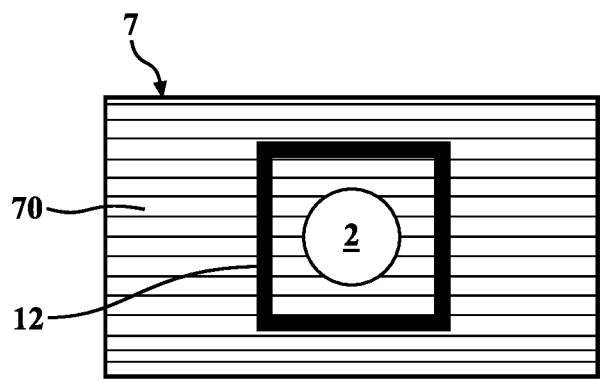
Figure 8:
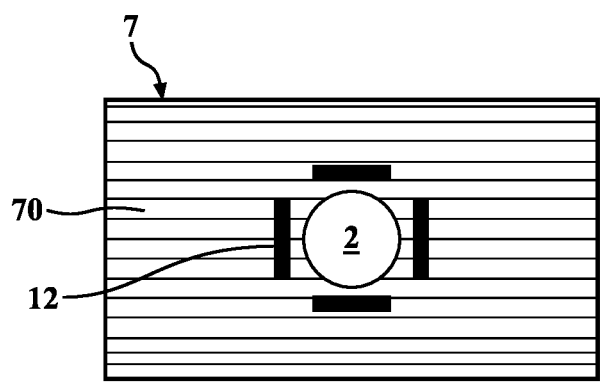

As will be illustrated in FIGS. 6 to 8, the cavity 72 may have different geometric shapes to allow a heating element with a corresponding shape to be accommodated. The cavity is in this case in the form of a groove made concentrically with the opening 2 that it surrounds, a small strip of material being retained between the cavity and the edge of the accessory fixed to the body delimiting the opening 2. Furthermore, the cavity has a thickness, that is to say in this case the dimension parallel to the emission-reception axis of the sensor/emitter, with dimensions smaller than the corresponding dimensions of the heating element, which thus protrudes toward the interior of the vehicle. It will be understood that this exemplary embodiment could be modified and that the heating element could be embedded in the thickness of the accessory fixed to the body, or be flush with the edge delimiting the opening 2.

In order to ensure the contact of the heating element 12 with the accessory 7 fixed to the body and thus to ensure the best possible conduction and convection of heat, the heating element 12 is preferably held against the internal face 70 of this accessory fixed to the body by appropriate fixing means. By way of example, the heating element may be adhesively bonded to this internal face, or be held by fastening clips secured to the internal face 70 of the accessory fixed to the body, the heating element being able to be fitted in the cavity by snap-fastening.

The protective element according to the invention has at least one heating element 12. As illustrated in FIGS. 6 and 7, a single heating element 12 may be provided, which entirely surrounds the opening 2 in the grille 7. The heating element is thus in the form of an annular ring, which may be circular or elliptical according to FIG. 6 or polygonal according to FIG. 7. Preferably, the form in FIG. 6 will be selected, making it possible to best follow the contour of the opening 2.

According to another variant illustrated in FIG. 8, a plurality of separate heating elements 12 can be employed, for example with a rectilinear shape and arranged perpendicularly with respect to one another.

A heating element 12 according to the invention may consist of an electrical resistance element or a positive temperature coefficient ceramic, in particular in the form of a film. As illustrated, the heating element is in this case integral with the internal face of the accessory fixed to the body.

In an alternative that is not shown, provision may be made for the heating element to consist of an electromagnetic induction system with a fixed part secured to the accessory fixed to the body that is supplied with current and forms an induction coil emitting an electromagnetic field in which there are disposed one or more metal elements forming a second part of the heating element that is disposed around the perimeter of the protective casing 6. This second metal part may in particular consist of a copper ring disposed around the detection/emission element 9, or of metal elements, made for example of titanium and indium, disposed in the transparent layer forming the detection/emission element 9.

In each of these alternatives, the heating element 12, at least the fixed part secured to the accessory fixed to the body, is electrically connected to a control unit 10.

The control unit 10 is configured to control the operation of the heating element(s) 12 present on the accessory 7 fixed to the body of the motor vehicle 100, and in particular to control the electrical power supply of this or these heating element(s). Preferably, the control unit 10 is configured such that the heating element(s) 12 radiate(s) heat in the region of the detection/emission element 9 of the protective casing 6. Thus, advantageously, the heating element(s) 12 also make it possible to rapidly melt a layer of ice covering the detection/emission element 9 and/or disposed in the radial clearance between the protective casing 6 and the accessory 7 fixed to the body.

To this end, the control unit 10 comprises a calculator 18, means 22 for storing at least one control program described below, and a communication interface 23 as illustrated in FIG. 4. The communication interface 23 allows the control unit 10 to dialog by way of known means with an on-board computer 24 of the motor vehicle 100. The on-board computer 24 centralizes all the information of the motor vehicle and the driving actions carried out by the driver. The on-board computer 24 is preferably connected to means, not shown, for measuring the temperature outside the motor vehicle in real time.

In the example illustrated, the communication interface 23 is also connected to the motor 5 so as to be able to control the electrical power supply of this motor and also to measure, in real time, the electrical power consumed by the motor 5 in order to pivot the protective casing 6.

The storage means 22 comprise at least one of the following control programs that allow a particular operating mode of the protective assembly according to the invention.

According to a first example of a control program according to the invention, the control unit 10 is configured to activate at least one heating element 12 for a predefined heating time when a user of the motor vehicle carries out a predefined action. By way of nonlimiting example, the predefined heating time may correspond to a time interval of one or more minutes, or a shorter time interval of a few seconds or tens of seconds, from when the predefined action is effected. The predefined action may for example correspond to the actuation of a remote control button by the user of the vehicle, or to the unlocking of the driver's door of the motor vehicle, or to the switching on or starting of the motor vehicle. This embodiment makes it possible to ensure that a layer of snow and/or ice cannot prevent the rotation of the case and does not cover the transparent wall forming all or part of the detection/emission element, during the first few minutes of driving during which driver assistance systems are usually used to help the driver rejoin a traffic corridor.

According to a second example of a control program according to the invention, the control unit 10 activates at least one heating element 12 for a predefined heating time when the control unit detects abnormal electrical power consumption by the motor 5. Here again, the predefined heating time may correspond to a time interval of one or more minutes, or a shorter time interval of a few seconds or tens of seconds from the moment this abnormal consumption is detected. Abnormal electrical power consumption by the motor 5 is defined as electrical power greater than the usual electrical power for allowing the protective casing 6 to be pivoted. By way of nonlimiting example, the electrical power may be considered to be abnormal when it exceeds the usual electrical power of the motor 5 by more than 20%. This second example of a control program advantageously allows the activation of at least one heating element 12 when a layer of snow and/or ice forms between the protective casing 6 and the accessory 7 fixed to the body, while the motor vehicle 10 is on the move, it being understood that the presence of a layer of ice prevents the rotation of the protective casing and forces the motor to provide more power.

According to a third example of a control program, the actuation of the heating element, or the implementation of the first or second control program, is conditional on the value of the ambient temperature outside the motor vehicle 100. The value of the ambient temperature is for example communicated to the control unit 10 by the on-board computer 24 of the vehicle 100. By way of example, the first control program or the second control program is implemented if, and only if, the value of the temperature outside the motor vehicle is equal to or less than a threshold value for example equal to 0° C., or at least less than 2° C. This embodiment advantageously makes it possible to ensure that the heating element(s) 12 is/are activated only in wintry conditions.

Figure 5:
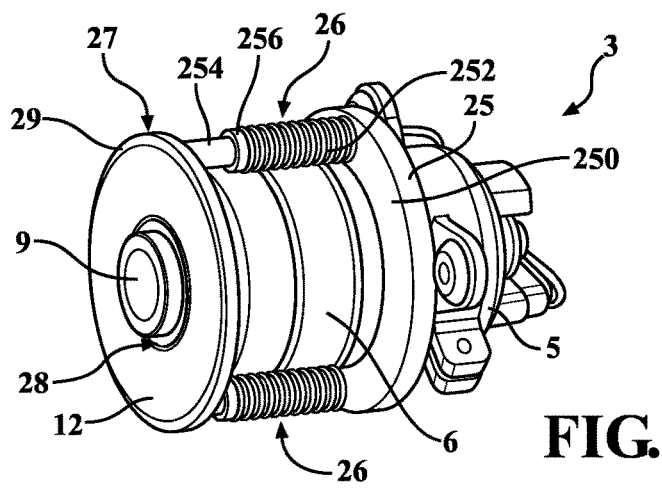
FIG. 5 shows a perspective view of a protective device for a sensor/emitter of a driver assistance system, according to a second embodiment of the invention in which a heating element is secured to the protective casing via a spring link involved in pressing the heating element against an accessory fixed to the body, facing which the shown protective device is positioned.

FIG. 5 illustrates a second embodiment of a protective casing according to the invention, which differs from the protective assembly described above in particular by way of the arrangement of the heating element 12.

More particularly, in this case, the heating element is secured to the protective device 3 such that the protective assembly formed by the protective device and by the associated heating element can be assembled and then mounted in its entirety in a single operation on the accessory 7 fixed to the body of the motor vehicle.

The protective device 3 in this case comprises an internal rotor motor 5, that is to say with a fixed external part and a holder 25 secured to the motor 5. This holder 25 has an annular base 250 disposed around the entire perimeter of the fixed part of the motor and has a plurality of uprights 252 protruding from the base along the protective device, parallel to the emission-reception axis of the sensor/emitter and in the direction of the detection/emission element. In the example illustrated, there are two uprights, which are diametrically opposite one another, but it will be understood that there could be a greater number thereof, which are advantageously distributed regularly about the axis. The base 250 and the uprights 252 form a fixed frame for the holder, which is able to cooperate with a movable assembly of the holder that is configured to move axially along the emission-reception axis by virtue of guidance effected by the fixed frame.

The movable assembly of the holder 250 has as many tubes 254 as there are uprights 252, each tube being hollow in order to slide about one of the uprights and having a collar 256 at a free end.

Elastic means 26 are disposed around each of the uprights, between the base 250 and one of the collars 254 formed at one end of a tube 256 that is able to slide about one of the uprights. The springs forming the elastic means 26 are configured to push the corresponding collars 254 away from the base 250 of the holder 25 when the elastic means are compressed.

The free end of the tubes 256 is secured to a disk 27 forming part of the movable assembly of the holder. The disk 27 has a hole at its center so as to form a ring arranged around the detection/emission element 9. As illustrated, the disk 27 has a central opening 28, the dimensions of which are designed such that its edges do not appear in the emission-detection field of the sensor/emitter 13. The front face 29 of the disk 27, that is to say the face that faces away from the holder 25 and the motor 5 and is able to be disposed facing the internal face 70 of the accessory 7 fixed to the body, is covered with a heating element 12.

In this second embodiment, the heating element 12, which forms a crown entirely surrounding the detection/emission element 9, is formed of a resistive film that is able to heat up when supplied with electrical power. The heating means 12 are connected electrically to the control unit via an electrical connection means that is able to pass along the uprights 252 through the elastic means 26.

As described above, the elastic means comprise springs that are mounted under compression so as to allow the disk 27 to press the heating element 12 against a wall of the body of a motor vehicle, for example the internal face 70 of the accessory 7 fixed to the body illustrated in FIG. 4, when the protective assembly 1, formed by the protective device 3 and the heating element 12, approaches the accessory 7 fixed to the body.

What is claimed is:

1. A protective assembly configured to protect a sensor/emitter of a driver assistance system of a motor vehicle, comprising:
   a protective device that surrounds a portion of the sensor/emitter, the protective device including:
      a first subassembly having a detection/emission element that submerges the sensor/emitter within the detection/emission element through which a signal passes, and
      a second subassembly having a motor configured to rotatably drive the first subassembly about an emission-reception axis of the sensor/emitter;
   where the first subassembly is arranged in front of the second subassembly;
   the protective assembly having at least one heating elements controlled by a control unit for heating at least one accessory fixed to a body of the motor vehicle next to the detection/emission element, the at least one heating element being disposed outside and at a distance from the protective device and adjacent the first subassembly.

2. The protective assembly of claim 1, where the control unit is configured to control an operation of the sensor/emitter.

3. The protective assembly of claim 1, where the at least one heating element has at least one fixed part that is configured to be positioned adjacent the at least one accessory fixed to the body, the at least one fixed part being supplied with current by the control unit.

4. The protective assembly of claim 1, where the at least one heating element is a resistive element supplied with electricity via the control unit, the resistive element forming the at least one fixed part.

5. The protective assembly of claim 1, where the at least one heating element is disposed on a holder secured to the protective device.

6. The protective assembly of claim 1, where a holder has a fixed frame secured to the protective device and a movable assembly to which the at least heating element is fixed and which is able to slide along the emission-reception axis.

7. The protective assembly of claim 1, where the at least one heating element has an electromagnetic induction source forming at least one fixed part and an associated induced metal element which is disposed against an external face of the protective device.

8. The protective assembly of claim 1, where the control unit is configured to activate the at least one heating element when a driver switches on or starts the motor vehicle or when the control unit detects abnormal resistance for driving the first subassembly in rotation.

9. The protective assembly of claim 1, where the control unit is configured to activate the at least one heating element when a temperature outside the motor vehicle is at least 2° C. or less.

10. A motor vehicle comprising an assembly for protecting a sensor/emitter of a driver assistance system of claim 1, where the sensor/emitter is present in the motor vehicle, and the detection/emission element of a protective casing is present at an opening formed in a wall of a body of the motor vehicle, and the at least one heating element are positioned on the wall.

\* \* \* \* \*